US011106821B2

(12) United States Patent
Roake et al.

(10) Patent No.: US 11,106,821 B2
(45) Date of Patent: Aug. 31, 2021

(54) DETERMINING PSEUDONYM VALUES USING TWEAK-BASED ENCRYPTION

(71) Applicant: EntIT Software LLC, Sunnyvale, CA (US)

(72) Inventors: Timothy Roake, Sunnyvale, CA (US); Luther Martin, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 190 days.

(21) Appl. No.: 15/926,425

(22) Filed: Mar. 20, 2018

(65) Prior Publication Data

US 2019/0294821 A1 Sep. 26, 2019

(51) Int. Cl.
*G06F 21/62* (2013.01)
*H04L 9/06* (2006.01)

(52) U.S. Cl.
CPC ........ *G06F 21/6254* (2013.01); *H04L 9/0631* (2013.01)

(58) Field of Classification Search
CPC H04L 2209/42; H04L 9/0631; G06F 21/6254
USPC .......................................................... 726/26
See application file for complete search history.

(56) References Cited

U.S. PATENT DOCUMENTS

| 9,349,026 | B2 | 5/2016 | Gianniotis et al. |
| 9,361,481 | B2 | 6/2016 | LaFever et al. |
| 9,432,181 | B2 | 8/2016 | Minematsu |
| 2005/0232429 | A1* | 10/2005 | Chowdhury .......... H04L 63/061 380/277 |
| 2006/0080554 | A1* | 4/2006 | McDonald .......... G06F 21/6254 713/189 |
| 2009/0100120 | A1* | 4/2009 | Gokay .................... G06F 7/722 708/491 |
| 2009/0193249 | A1 | 7/2009 | Conrado et al. |
| 2009/0265788 | A1 | 10/2009 | Ehrenschwender et al. |
| 2013/0238646 | A1* | 9/2013 | Maro .................. G06F 21/6227 707/758 |
| 2014/0156990 | A1* | 6/2014 | Dare ................... H04L 63/0823 713/156 |

(Continued)

FOREIGN PATENT DOCUMENTS

| EP | 2124166 | 11/2009 |
| WO | WO2014075836 A1 | 5/2014 |

OTHER PUBLICATIONS

Alfalahi, Alyaa; "Pseudonymisation of Personal Names and other PHIs in an Annotated Clinical Swedish Corpus"; DSV, Stockholm University; Forum 100, 164 40; Kista, Sweden; E-mail: alyalfa@dsv.su.se,sarabri@dsv.su.se, hercules@dsv.su.se; pp. 49-54; 6 pages.

(Continued)

*Primary Examiner* — Teshome Hailu

(57) ABSTRACT

A technique includes accessing data that represents a plurality of values that are associated with a plurality of ranges. The technique includes determining a pseudonym value for a given value, where the given value is associated with a given range and determining the pseudonym includes encrypting the given value to provide the pseudonym value; controlling the encryption to cause the pseudonym value to be within the given range; and tweaking the encryption based on an attribute that is associated with the given value.

20 Claims, 6 Drawing Sheets

(56) References Cited

U.S. PATENT DOCUMENTS

| | | | |
|---|---|---|---|
| 2014/0201519 A1* | 7/2014 | Dare | H04L 9/3268 |
| | | | 713/156 |
| 2015/0143133 A1* | 5/2015 | Burnett | G06F 21/6209 |
| | | | 713/189 |
| 2016/0344702 A1* | 11/2016 | Ukena | G06F 21/6245 |
| 2017/0177683 A1* | 6/2017 | Koike | G06F 7/026 |
| 2017/0272472 A1 | 9/2017 | Adhar | |
| 2018/0189515 A1* | 7/2018 | Wang | G06F 21/6254 |
| 2019/0296914 A1 | 9/2019 | Martin et al. | |

OTHER PUBLICATIONS

Heurix, Johannes; "Pseudonymization with Metadata Encryption for Privacy-Preserving Searchable Documents"; IEE computer society; 2012 45th Hawaii International Conference on System Sciences; IEEE, DOI 10.1109/HICSS.2012.491; 2012; pp. 3011-3020; 10 pages.

Narayanan, Arvind; "Robust De-anonymization of Large Sparse Datasets"; IEEE Symposium on Security and Privacy, 2008; 978-0-7695-3168-7 /08 $25.00 © 2008 IEEE, DOI 10.1109/SP; pp. 111-125; 15 pages.

Tsiafoulis, Stergios G.; "Maximum Entropy Oriented Anonymization Algorithm for Privacy Preserving Data Mining"; ResearchGate, DOI:10.1007/978-3-642-33448-1_2; www.researchgate.net/publication/287538650; Jan. 2012; 9 pages.

Campero, Alejandro N.; "Balancing Utility and Privacy of High-Dimensional Archives Datasets: Mobile Phone Metadata"; Submitted to Massachusetts Institute of Technology, Sep. 2015; 76 pp.

Hintze, Mike; "Meeting Upcoming GDPR Requirements While Maximizing the Full Value of Data Analytics/Balancing the Interests of Regulators, Data Controllers and Data Subjects": White Paper; Co-Founder at Anonos; Jan. 2017; 24 pp.

Imperva; "Pseudonymization"; Compliance 101; Data Security & Compliance Center; https://www.imperva.com/data-security/; 2017; 6 pp.

Information Age; "Why Companies Need Pseudonymisation and Data Masking for GDPR Compliance"; www.information-age.com/why-companies-need-pseudonymisation-and-data-masking-gdpr-compliance-123461628/; Nov. 21, 2017; 9 pp.

Jabeen, Farhana; IEEE Access; "Enhanced Architecture for Privacy Preserving Data Integration in a Medical Research Environment"; Publication May 31, 2017; Date of Current Version Jul. 31, 2017; 19 pp.

* cited by examiner

DETERMINING PSEUDONYM VALUES USING TWEAK-BASED ENCRYPTION

BACKGROUND

A business organization (a retail business, a professional corporation, a financial institution, and so forth) may collect, process and/or store data that represents sensitive or confidential information about individuals or business organizations. For example, the data may be personal data that may represent names, residence addresses, medical histories, salaries, banking information, and so forth. The data may be initially collected or acquired in "plaintext form," and as such may be referred to as "plaintext data." Plaintext data refers to ordinarily readable data. As an example, plaintext data may be a sequence of character codes, or string, which conveys the residence address of an individual in a particular language; or as another example, plaintext data may be a number that conveys, in an Arabic representation (or other number representation), a blood pressure reading.

To control access to sensitive data, (as a measure to safeguard individual privacy, for example), a process called "pseudonymization," may be used to convert plaintext sensitive data items to corresponding pseudonyms. A pseudonym ideally has no exploitable meaning or value, and accordingly, the pseudonym ideally does not, by itself, convey information that may be attributed to a specific entity (an individual for the case of personal information, for example).

DETAILED DESCRIPTION

Figure 1:
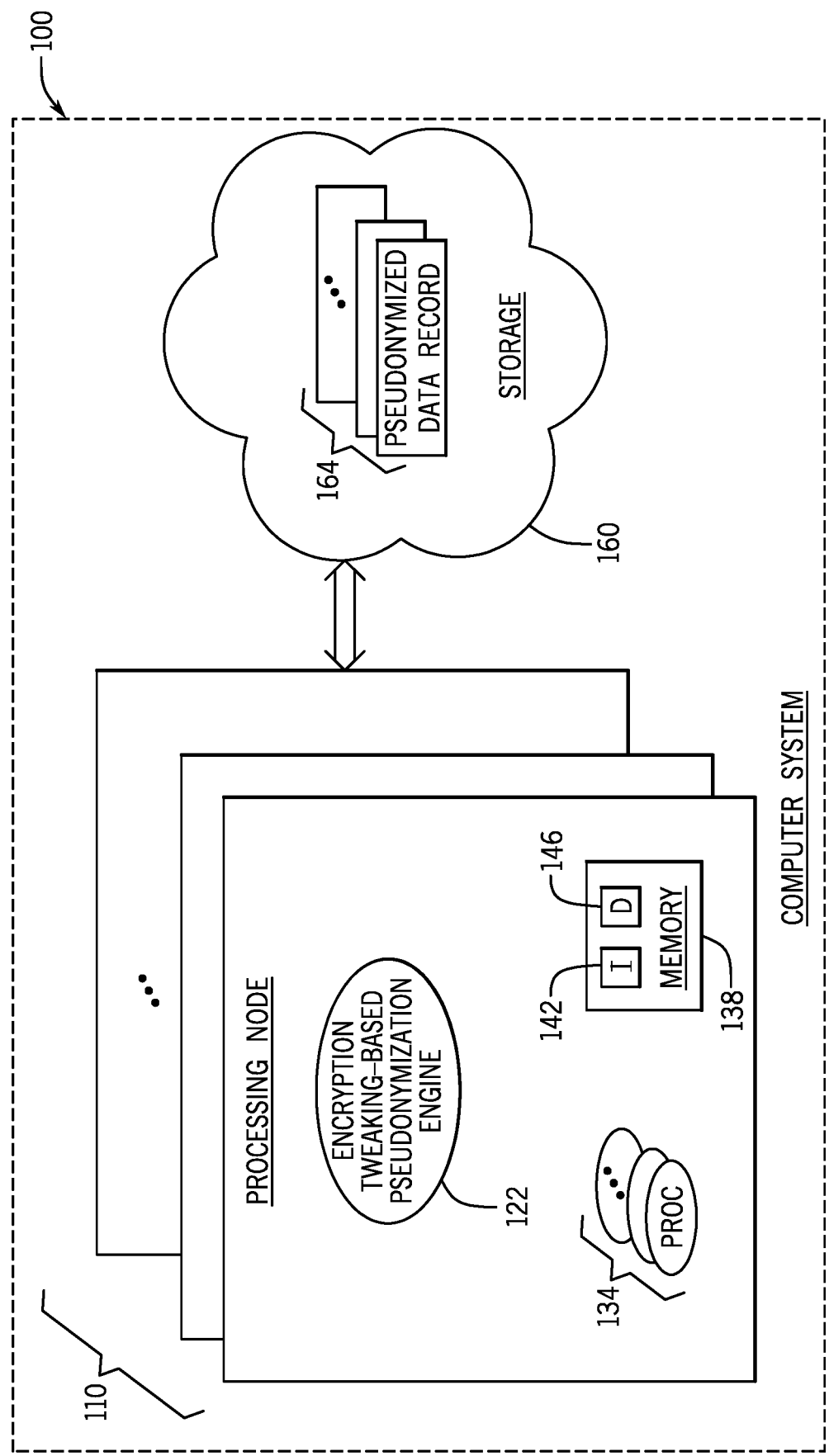
FIG. 1 is a schematic diagram of a computer system according to an example implementation.

For purposes of controlling access to sensitive information (e.g., information relating to confidential or sensitive information about one or more business enterprises and/or individuals) plaintext data items, which represent the sensitive information, may be converted, through a process called "pseudonymization," into corresponding pseudonymns, or pseudonym values. In this context, a "plaintext data item" (also referred to as "plaintext," or a "plaintext value" herein) refers to a unit of data (a string, an integer, a real number, and so forth) that represents ordinarily readable content. As examples, a plaintext data item may be data that represents, in a particular number representation (an Arabic representation), a blood pressure measurement, a salary, and so forth. The pseudonym value by itself is meaningless, as the pseudonym value ideally conveys no information about the entity associated with the corresponding plaintext value. The pseudonymization may or may not be reversible: reversible pseudonymization processes allow plaintext values to be recovered from the corresponding pseudonym values, whereas irreversible pseudonymization processes do not.

One way to convert a plaintext value to a corresponding pseudonym value is to encrypt the plaintext value using an encryption cipher to form ciphertext, i.e., the pseudonym value. Without access to the key used in the encryption, the pseudonym has no exploitable meaning or value. Moreover, format preserving encryption (FPE) may be employed so that the format of the plaintext value is preserved in the pseudonym value, which allows pseudonym values to be stored in the same data structure format(s) as the corresponding plaintext values.

The pseudonymization process may serve various purposes, such as serving as a measure to control access to the personal information. In this manner, a given business organization may have a policy of storing personal data as pseudonyms and the pseudonyms may be converted back to plaintext, as needed. For example, the sensitive data may be personal data, which may represent personal information about the public, private and/or professional lives of individuals.

In some cases, it may be useful to process pseudonymized data to gather statistical information. Pseudonymized data may also be provided to third parties that analyze the data, while still preserving privacy/confidentiality of the data. For example, it may be beneficial to statistically analyze pseudonymized health records (i.e. health records in which sensitive plaintext values have been replaced with corresponding pseudonym values), for purposes of gathering information (weights, blood pressures, and so forth) about particular sectors, or demographics, of the population. The pseudonymization process may, however, significantly alter, if not destroy, statistical properties of the personal information. In this manner, a collection of plaintext values may have certain statistical properties that may be represented by various statistical measures (means, variances, ranges, distributions, and so forth). For example, if the pseudonymization process merely involves encrypting the plaintext data, the statistical properties of the plaintext may not be reflected in the corresponding ciphertext.

In accordance with example implementations that are described herein, techniques and systems are employed to convert plaintext into corresponding pseudonyms in a pseudonymization process that preserves one or more statistical properties of the plaintext values. More specifically, in accordance with example implementations, techniques and systems are described herein to convert plaintext values into pseudonym values in a manner that enhances the disorder, or entropy, of the pseudonym values (thereby making it more difficult to associate the pseudonym values with corresponding plaintext values), while at the same time keeping a one to one correspondence between the brackets, or ranges, of the plaintext values and the ranges of the pseudonym values.

In accordance with example implementations, a "one to one correspondence" between a range of plaintext values and a range of pseudonym values refers to the ranges being the same and containing substantially the same number, if not exactly the same number, of plaintext values as the number of corresponding pseudonym values. For example, plaintext data values may represent diastolic blood pressure measurements and may be partitioned, or bracketed, into certain ranges. For example, the diastolic blood pressure values may be bracketed into the ranges of 60 to 70, 70 to 80, 80 to 90, and so forth. In accordance with example implementations, a pseudonymization process may be applied in a manner that converts the actual diastolic blood pressure values (i.e., the plaintext values) in the range of 60 to 70 to pseudonym values in the range of 60 to 70; converts actual diastolic blood pressure values in the range of 70 to 80 to pseudonym values in the range of 70 to 80; and so forth. Moreover, the pseudonymization process is performed in a manner that enhances, if not maximizes, the entropy of the pseudonym values in each of the ranges.

In accordance with example implementations, the pseudonymization process may be performed by a pseudonymization engine that applies an encryption cipher to the plaintext values to generate the corresponding pseudonym values; and the pseudonymization engine tweaks the encryption cipher based on ancillary data associated with the plaintext values. In this manner, each plaintext data value may be associated with one or multiple attributes (i.e., "ancillary data"), such as, for example, an index number, or value. For the example, for a sample size of 1000, a particular plaintext data value (associated with a particular patient, for example) may be associated with an index number (or "index") of "53." The pseudonymization engine may, for example, divide the sample size by the index number to determine a corresponding remainder, and use this remainder as a "tweak" for the encryption that is applied to the plaintext value to generate the corresponding ciphertext (i.e., the pseudonym value).

In the context of this application, the "tweaking" of the encryption refers to the pseudonymization engine selecting a particular permutation of a cipher used in the encryption based on a tweak input, or selector, such as the above-described remainder. For example, in accordance with some implementations, the cipher used in the encryption may be a block cipher, and an encryption key may be used as an index to select a certain permutation (of a plurality of potential permutations) of the block cipher. The tweak input, or selector, may be used as an additional index that is used to select the permutation of the block cipher. In other words, in accordance with example implementations, the combination of the key and the tweak may form an index that selects the permutation for the block cipher. Unlike the encryption key, which is preserved in secrecy, the tweak input, may not be a secret, such as, the above-described tweak derived from an index that is associated with the plaintext value.

As described herein, in accordance with some implementations, the pseudonymization engine performs the encryption of the plaintext values in a manner that employs FPE and also ensures that the pseudonym values remain in the same range as their corresponding plaintext values. For example, for the diastolic blood pressure ranges set forth above, the pseudonymization engine may, for example, convert the plaintext data representing the diastolic blood pressure measurement values within the range of 80 to 90 to produce the same number of corresponding pseudonym values for the 80 to 90 bracket, thereby preserving the number in the range to allow useful statistical information to be gleaned from the pseudonym values. Moreover, in accordance with example implementations, the pseudonymization process may be reversible. In this manner, a given pseudonym value may be converted back to its corresponding plaintext value based on knowledge of the index number, the encryption key and the pseudonym value.

Referring to FIG. 1, as a more specific example, in accordance with some implementations, a computer system 100 may include one or multiple encryption tweaking based pseudonymization engines 122 (herein called "pseudonymization engines 122") for purposes of converting plaintext data into pseudonym data, and vice versa. The computer system 100 may be a desktop computer, a server, a client, a tablet computer, a portable computer, a public cloud-based computer system, a private cloud-based computer system, a hybrid cloud-based computer system (i.e., a system that has public and private cloud components), a private computer system having multiple computer components disposed on site, a private computer system having multiple computer components geographically distributed over multiple locations, and so forth.

Regardless of its particular form, in accordance with some implementations, the computer system 100 may include one or multiple processing nodes 110, and each processing node 110 may include one or multiple personal computers, work stations, servers, rack-mounted computers, special purpose computers, and so forth. Depending on the particular implementation, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 110 may be associated with one or multiple virtual machines that are hosted by one or multiple physical machines.

In accordance with some implementations, the processing nodes 110 may be coupled to a storage 160 of the computer system 100 through network fabric (not depicted in FIG. 1). In general, the network fabric may include components that use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The storage 160 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the storage 160 may be located at the same geographical location or may be located at multiple geographical locations. Regardless of its particular form, the storage 160 may store pseudonymized data records 164 (i.e., data representing pseudonyms, or pseudonym values, generated as described herein).

In accordance with some implementations, a given processing node 110 may include a pseudonymization engine 122, which is constructed to convert plaintext values, represented by plaintext data records, into corresponding pseudonym values, represented by the pseudonym data records 164, and vice versa. In particular, in accordance with example implementations, the pseudonymization engine 122 performs the transformations between the plaintext values and the pseudonym values while maintaining the number of elements within bracketed ranges. As described herein, in accordance with example implementations, the pseudonymization engine 122 applies index-based encryption/decryption tweaking so that plaintext values permute to random values with a defined range, and vice versa.

In accordance with example implementations, the processing node 110 may include one or multiple physical hardware processors 134, such as one or multiple central processing units (CPUs), one or multiple CPU cores, and so forth. Moreover, the processing node 110 may include a local memory 138. In general, the local memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store data 146 (data representing plaintext values, pseudonym values, indices associated with the data values, encryption keys, tweak inputs, remainders, index values, sample sizes, ancillary data associated with plaintext values and so forth). The memory 138 may store instructions 142 that, when executed by one or multiple processors 134, cause the processor(s) 134 to form one or multiple components of the processing node 110, such as, for example, the pseudonymization engine 122.

In accordance with some implementations, the pseudonymization engine 122 may be implemented at least in part by a hardware circuit that does not include a processor executing machine executable instructions. In this regard, in accordance with some implementations, the engine 122 may be formed from whole or in part by a hardware processor that does not execute machine executable instructions, such as, for example, an application specific integrated circuit (ASIC), a field programmable gate array (FPGA), and so forth. Thus, many implementations are contemplated, which are within the scope of the appended claims.

Figure 2:
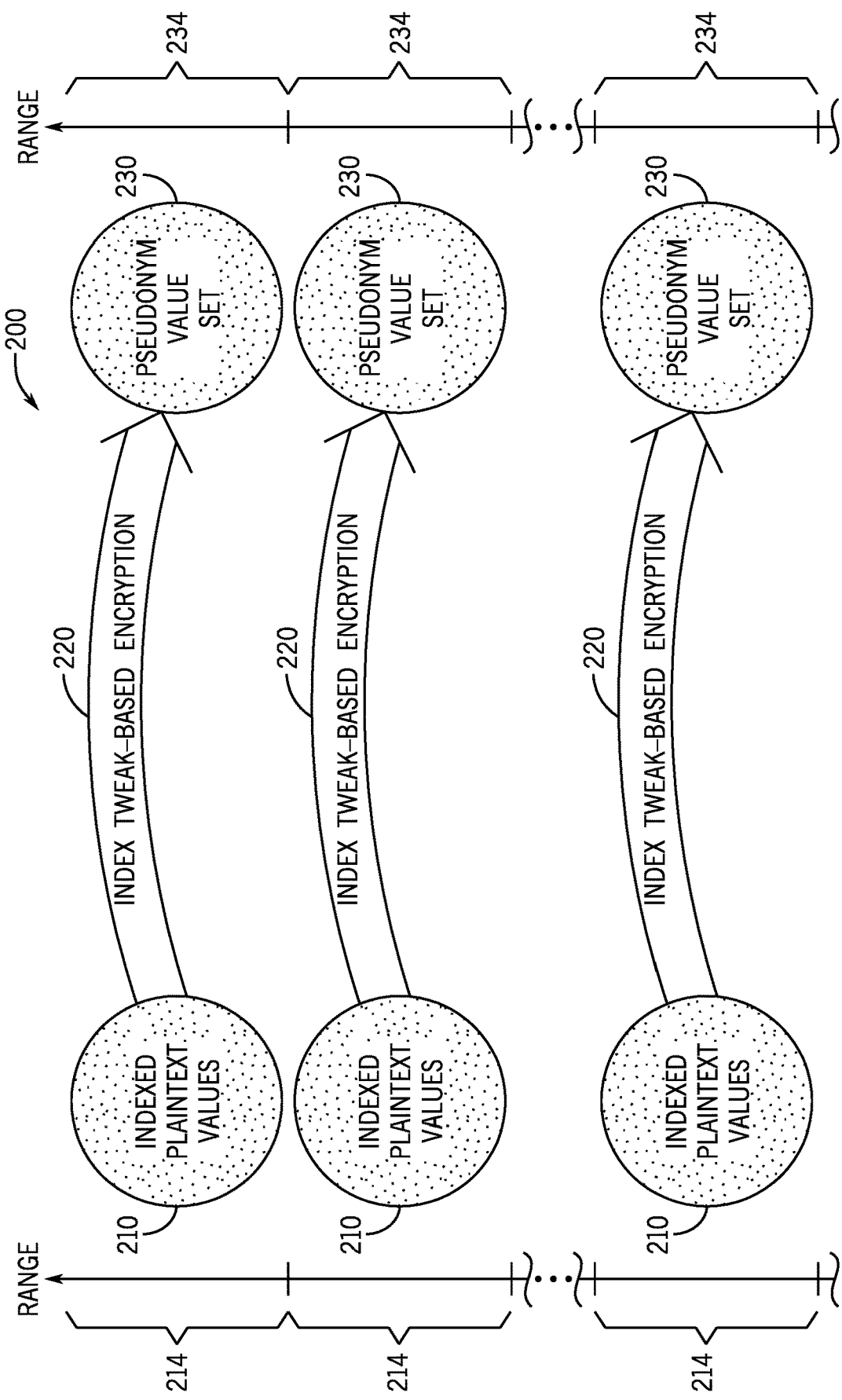
FIG. 2 is an illustration of the use of index tweak-based encryption to convert plaintext values to pseudonym values according to an example implementation.

FIG. 2 depicts an illustration 200 of the conversion of plaintext values to pseudonym values, in accordance with some implementations. In particular, for the example depicted in FIG. 2, sets 210 of indexed plaintext values are partitioned, or bracketed, into corresponding brackets, or ranges 214. For example, the plaintext values may be diastolic blood pressure measurement values that are grouped into corresponding diastolic pressure ranges. As depicted in FIG. 2, for each set 210 of index plaintext values, the pseudonymization engine 122 applies index tweak-based encryption 220 to produce a corresponding set 230 of pseudonym values in a bracket 234, which is the same as the bracket 210 of the corresponding set 210 of plaintext values. The index tweak-based encryption 220 enhances the entropy, or disorder, of the set 230 of pseudonym values, while, at the same time, preserving one or multiple statistical properties (the mean, or average, for example) of the corresponding set 210 of plaintext values.

It is noted that the index tweak-based encryption 220 may, in accordance with some implementations, destroy one or multiple statistical properties (change the statistical distribution, for example), while preserving one or multiple other statistical properties, such as the mean, or average. For example, in accordance with some implementations, the index tweak-based encryption 220 may change a normal, or Gaussian, distribution into a relatively flat, or uniform statistical distribution.

As a more specific example, a set of plaintext values may vary between 100 and 200 and have a normal statistical distribution with a maxima at the 150 value. Applying FPE without the tweak may move all of the 150s to the same value, such as, for example, 176. An attacker may see the 176 value and determine that it is likely that the value of 176 is the original plaintext value of 150. With this observation, the attacker may then start to reduce the set and determine other plaintext values.

The increased entropy enhancement that is provided by the index tweak-based encryption 220, however, helps to disperse the dataset, creating a relatively uniform distribution. Thus, although, in accordance with example implementations, the index tweak-based encryption 220 may maintain the mean in the transformed data, the encryption 220 may destroy, or significantly change, the variance of the data.

As a more specific example, a given set 210 of index plaintext values may correspond to systolic blood pressure measurements within a range of 115 to 125. Person A may have a systolic blood pressure of 120, and Person B may also have a systolic blood pressure of 120. Moreover, for this example, the average systolic blood pressure in the 115 to 125 range may be 120. For this example, although Person A and Person B may have the same measured systolic blood pressure, due to the different associated index values, the blood pressure for Person A may, due to the tweak-based encryption, convert to a pseudonym value of "124," while the systolic blood pressure measurement value for Person B may convert to a pseudonym value of "123."

In accordance with some implementations, the pseudonymization engine 122 performs an operation (a modulo operation, for example) to determine the tweak, or inputs, that is applied to the encryption. In this manner, in accordance with some implementations, the pseudonymization engine 122 may apply a modulo operation to determine the remainder of dividing the sample size (i.e., the maximum index number) by the index number associated with the plaintext value (the index number associated with Person A or Person B for the foregoing example). The pseudonymization engine 122 may then form a selector based on an encryption key and the remainder (concatenate the key and the remainder, for example) and use the selector as a tweak input to select the particular cipher permutation to apply to convert the plaintext value to the corresponding pseudonym value.

In accordance with further example implementations, the tweak may be derived from one or multiple aspects associated with the plaintext values other than an index. For example, the tweak may be based on such ancillary data as associated age, an associated zipcode, an associated name, and so forth. Although the tweak may not be confidential (and therefore, may be accessible for purposes of converting the pseudonym values back to the corresponding plaintext values), the encryption key is preserved in secrecy. As such, the combination of the tweak and the encryption key may be used for purposes of converting the plaintext values into the pseudonym values, and vice versa.

Figure 3:
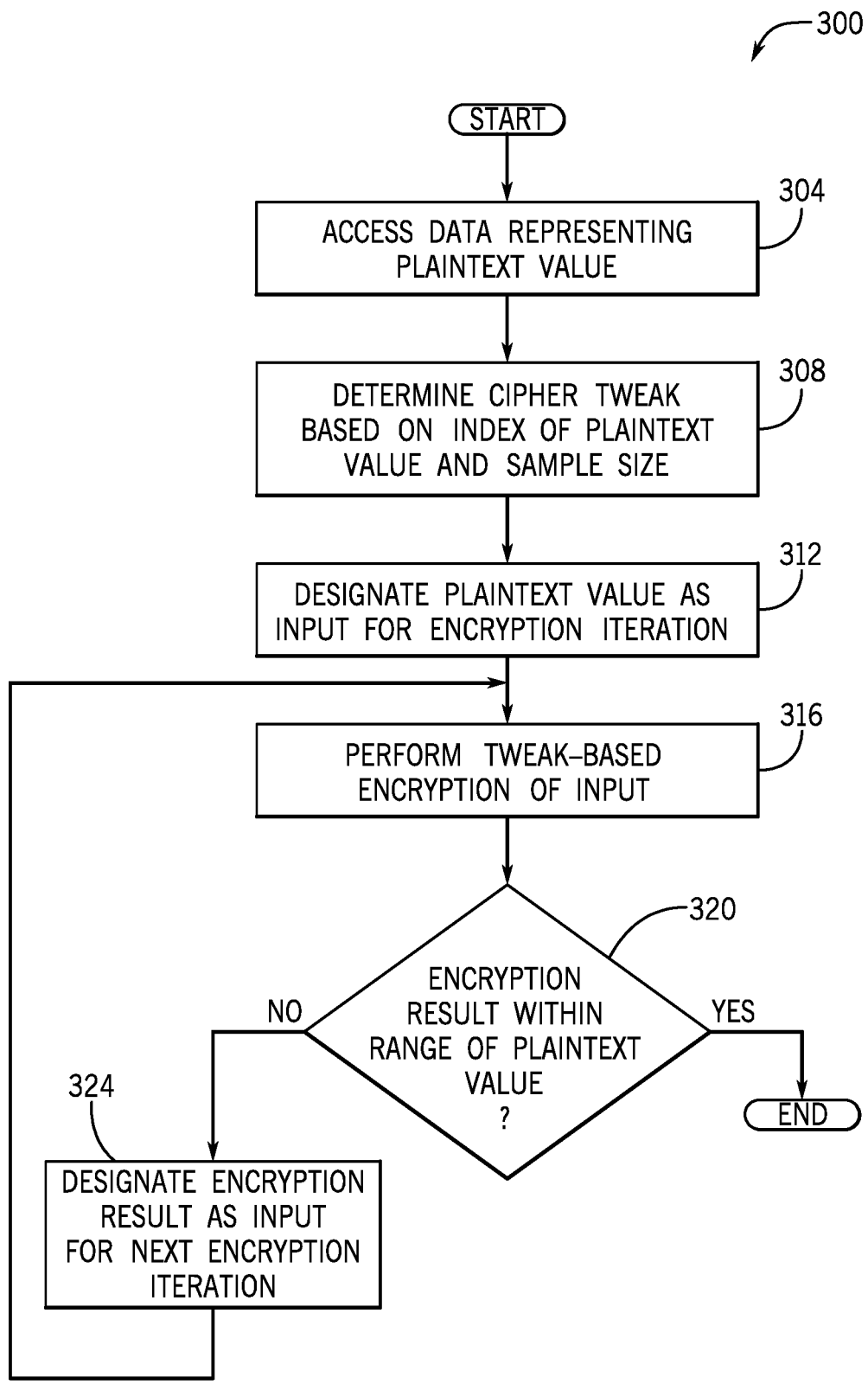
FIG. 3 is a flow diagram depicting a technique to use index tweak-based format preserving encryption (FPE) to convert plaintext values to pseudonym values according to an example implementation.

In accordance with some implementations, the pseudonymization engine 122 applies FPE. In this manner, for the foregoing example, for the systolic blood pressure range of 115 to 125, the data values within this range have three digits. Correspondingly, the pseudonym values for this range are also three digit values (and also are within the range of 115 to 125). FIG. 3 depicts an example index-based tweaking approach that may be used in conjunction with FPE. More specifically, referring to FIG. 3 in conjunction with FIG. 1, in accordance with some implementations, the technique 300 includes the pseudonymization engine 122 accessing (block 304) data representing a particular plaintext value and determining (block 308) a cipher tweak based on the index of the plaintext value and the sample size. In this manner, in accordance with some implementations, as discussed above, determining the tweak may involve determining a remainder after dividing the index into the sample size.

Due to the FPE, a number of encryption iterations may be performed for purposes of determining a pseudonym value that is within the range of the plaintext value. Block 312 of FIG. 3 involves designating the plaintext value as the input for the first iteration of encryption. It is noted that, in accordance with some implementations, a single iteration may be performed, in that the result of the encryption produces a pseudonym value, which is in the correct range. However, in accordance with example implementations, a single iteration may not produce a pseudonym value within the correct range, and accordingly, one or multiple additional iterations may be performed until a pseudonym value within the range is produced.

More specifically, as depicted in FIG. 3, the technique includes the pseudonymization engine 122 (block 316) tweak-based encryption of the input. In this manner, as discussed herein, this encryption may include using the determined tweak and encryption key to form a selector to select a particular cipher permutation for the encryption. The pseudonymization engine 122 may next determine (decision block 320) whether the encryption result is within the range, or bracket, of the plaintext value, and if so, the technique 300 ends, as the pseudonym value has been determined. If, however, in decision block 320, the pseudonymization engine 122 determines that the encryption result is not within the bracket of the plaintext value, then, the engine 122 may designate (block 324) the encryption result as an input for the next iteration of encryption, and control returns to block 316.

Figure 4:
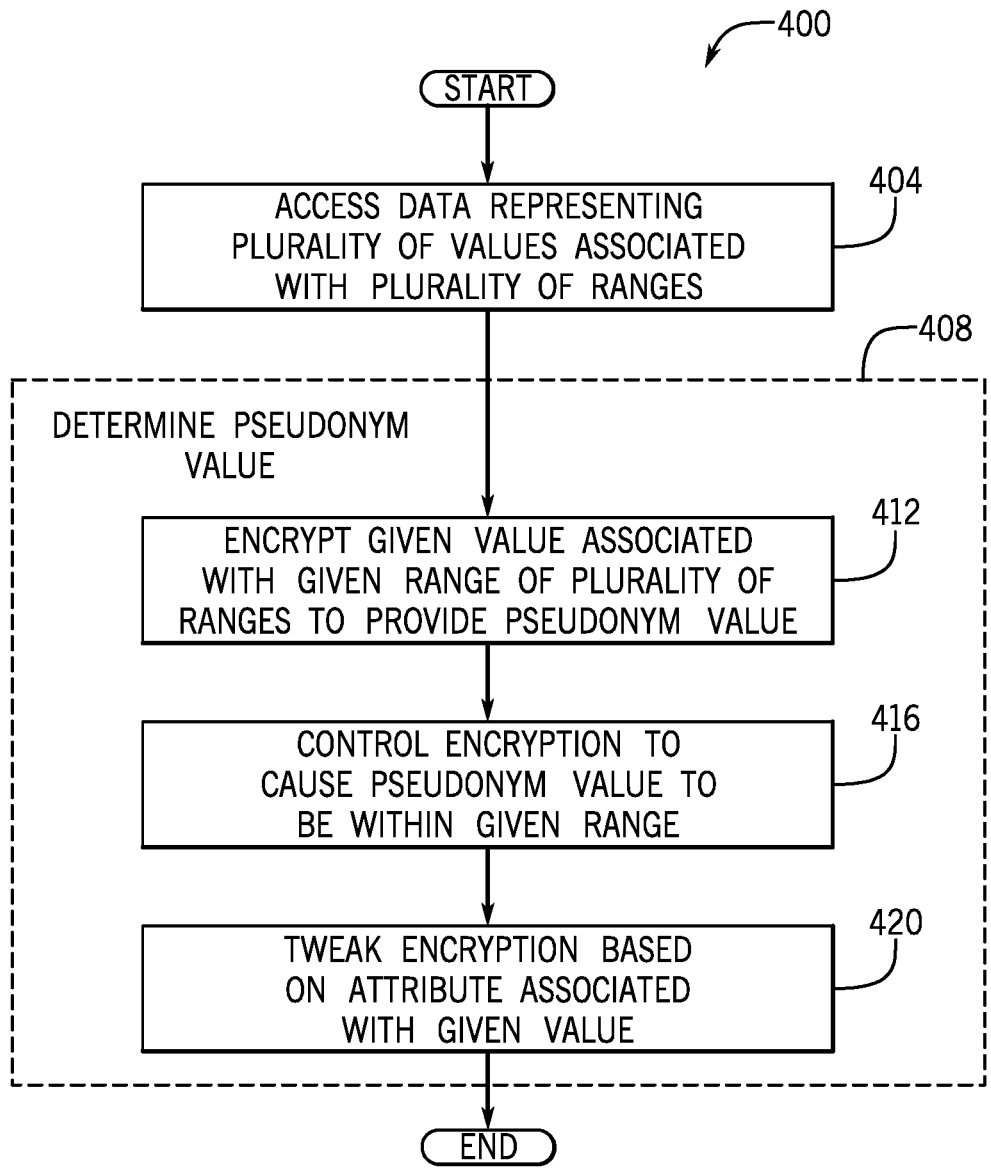
FIG. 4 is a flow diagram depicting a technique to determine a pseudonym value used tweak-based encryption according to an example implementation.

Thus, referring to FIG. 4, in accordance with example implementations, a technique 400 includes accessing (block 404) data representing a plurality of values associated with a plurality of ranges; and determining (block 408) a pseudonym value for a given value of the plurality of values. The given value is associated with a given range of the plurality of ranges, and determining the pseudonym value includes encrypting (block 412) the given value to provide the pseudonym value; controlling (block 416) the encryption to cause the pseudonym value to be within the given range; and tweaking (block 420) the encryption based on an attribute that is associated with the given value.

Figure 5:
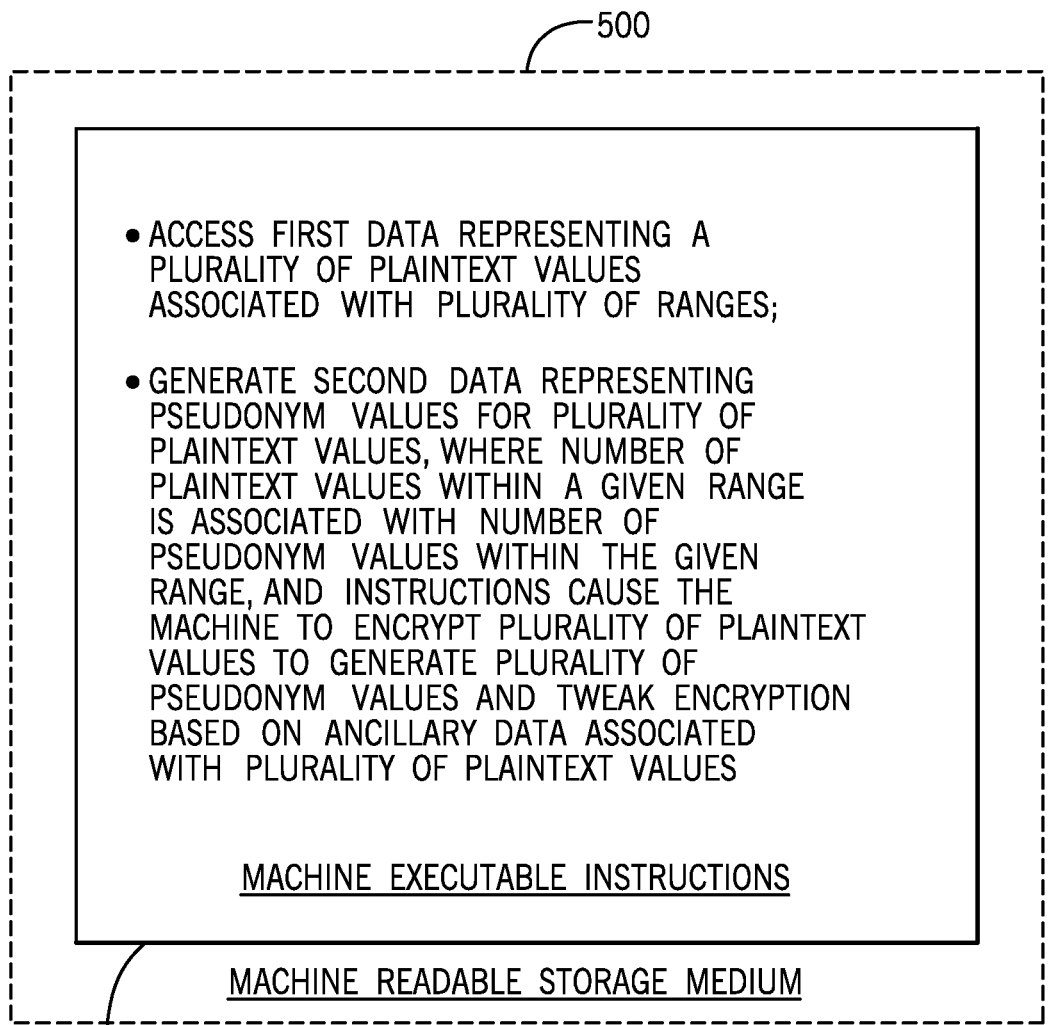
FIG. 5 is an illustration of a machine readable storage medium storing machine executable instructions to generate data representing pseudonym values according to an example implementation.

Referring to FIG. 5, in accordance with example implementations, a non-transitory storage medium 500 stores machine executable instructions 518 that, when executed by a machine, cause the machine to access first data representing a plurality of plaintext values that are associated with a plurality of ranges. The instructions, when executed by the machine, cause the machine to generate second data, which represents pseudonym values for the plurality of plaintext values. The number of plaintext values within a given range is associated with the number of pseudonym values within the given range. The instructions cause the machine to encrypt the plurality of plaintext values to generate the plurality of pseudonym values and tweak the encryption based on ancillary data associated with the plurality of plaintext values.

Figure 6:
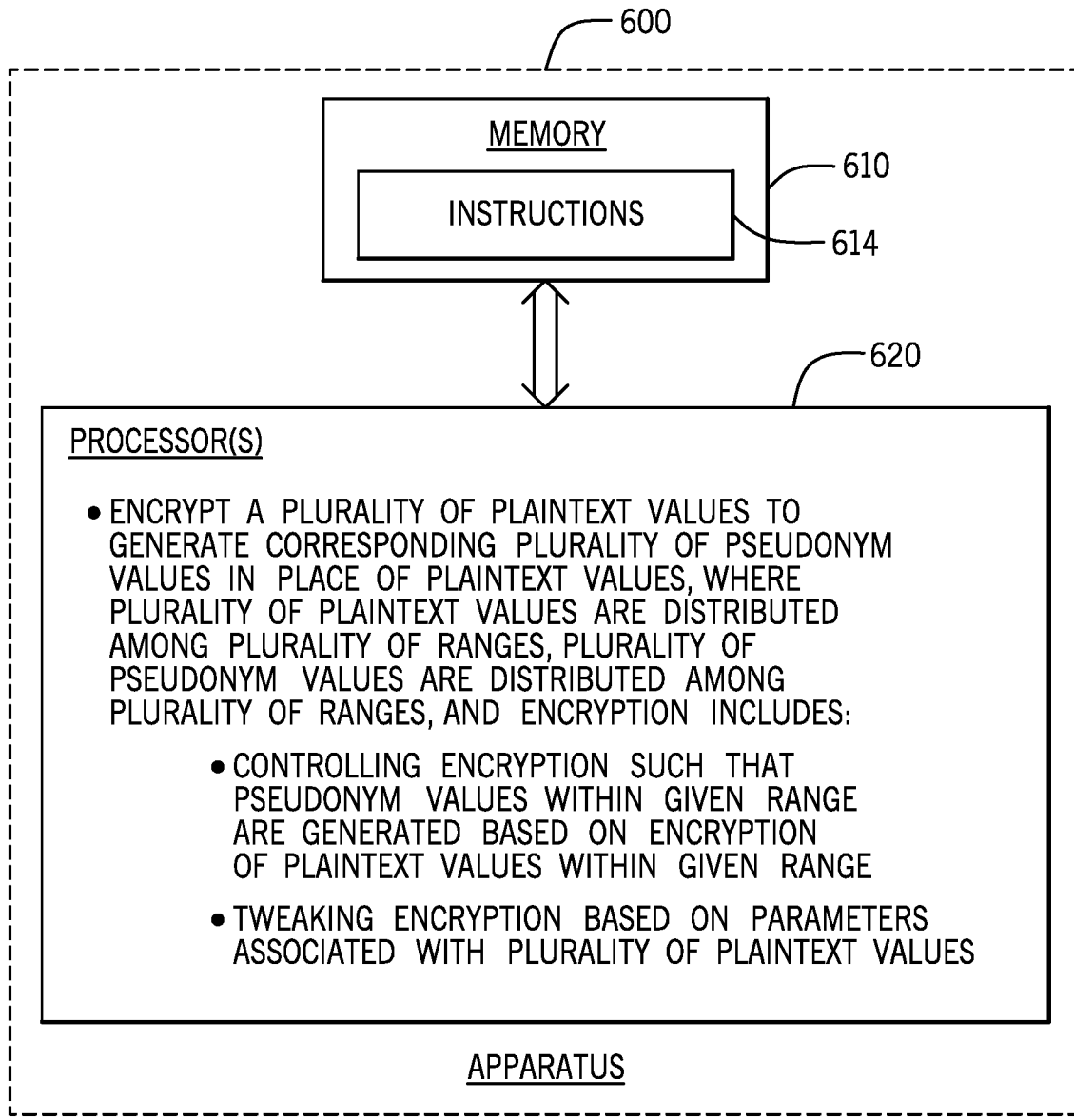
FIG. 6 is a schematic diagram of an apparatus to apply tweak-based encryption to generate pseudonym values in place of plaintext values according to an example implementation.

Referring to FIG. 6, in accordance with example implementations, an apparatus 600 includes at least one processor 620 and a memory 610 to store instructions 614 that, when executed by the processor(s) 620, cause the processor(s) 620 to encrypt a plurality of plaintext values to generate a corresponding plurality of tokens in place of the plaintext values. The plurality of plaintext values are distributed among a plurality of ranges, and the plurality of tokens are distributed among the plurality of ranges. The encryption includes controlling the encryption such that the tokens within a given range are generated based on the encryption of plaintext values within the given range; and tweaking the encryption based on parameters that are associated with the plaintext values.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
accessing data representing a plurality of plaintext values having a plurality of ranges, wherein the plurality of plaintext values are associated with an attribute category, the plurality of plaintext values correspond to a collection of numbers for the attribute category, the plurality of ranges correspond to different ranges of numbers of the collection of numbers, and the collection of numbers has a statistical property; and
determining a plurality of pseudonym values corresponding to the plurality of plaintext values and preserving the statistical property, wherein a first pseudonym value of the plurality of pseudonym values for a first plaintext value of the plurality of plaintext values is associated with a first range of the plurality of ranges, wherein determining the first pseudonym value of the plurality of pseudonym values comprises encrypting the first plaintext value of the plurality of plaintext values to provide the first pseudonym value, wherein the encrypting of the first plaintext value is controlled to cause the first pseudonym value to be within the first range and the encrypting of the plaintext value is tweaked based on an attribute associated with the first plaintext value.

2. The method of claim 1, wherein determining the plurality of pseudonym values further comprises:
performing a succession of encryption iterations comprising an initial encryption iteration and a last encryption iteration, and designating a given iteration of the succession of encryption iterations to be the last encryption iteration in response to the given iteration providing a ciphertext value within the first range.

3. The method of claim 2, wherein the initial encryption iteration determines a first ciphertext value based on the first plaintext value, and each subsequent encryption iteration of the succession of encryption iterations after the initial encryption iteration determines a ciphertext value based on a ciphertext value determined in an encryption iteration of the encryption iterations preceding the each subsequent encryption iteration.

4. The method of claim 1, wherein the encrypting is tweaked further based on an index associated with the first plaintext value.

5. The method of claim 1, wherein determining the plurality of pseudonym values further comprises:
encrypting a second plaintext value of the plurality of plaintext values to provide a second pseudonym value;
controlling the encrypting of the second plaintext value to cause the second pseudonym value to be within the first range; and
tweaking the encrypting of the second plaintext value based on attributes associated with the second plaintext value.

6. The method of claim 1, wherein encrypting the first plaintext value comprises performing format preserving encryption.

7. The method of claim 1, wherein the plurality of ranges comprises non-overlapping ranges.

8. The method of claim 1, further comprising:
   decrypting the first pseudonym value based on the attribute to recover the first plaintext value.

9. The method of claim 1, wherein the encrypting is tweaked further based on a name or an address associated with the first plaintext value.

10. The method of claim 1, wherein tweaking the encrypting comprises selecting a permutation of a cipher used in the encrypting based on the attribute.

11. A non-transitory storage medium storing instructions that, when executed by a machine, cause the machine to:
   access first data representing a plurality of plaintext values having a plurality of ranges, wherein the plurality of plaintext values are associated with an attribute category, the plurality of plaintext values correspond to a collection of numbers for the attribute category, the plurality of ranges correspond to different ranges of numbers of the collection of numbers, and the collection of numbers has a statistical property; and
   generate second data representing a plurality of pseudonym values corresponding to the plurality of plaintext values and preserving the statistical property, wherein a first pseudonym value of the plurality of pseudonym values for a first plaintext value of the plurality of plaintext values is associated with a first range of the plurality of ranges, wherein determining the first pseudonym value comprises encrypting the first plaintext value to provide the first pseudonym value, and wherein the encrypting is controlled to cause the first pseudonym value to be within the first range and the encrypting is tweaked based on an attribute associated with the first plaintext value.

12. The storage medium of claim 11, wherein the statistical property comprises a mean of the collection of numbers.

13. The storage medium of claim 11, wherein the plurality of pseudonym values has a random distribution.

14. The storage medium of claim 11, wherein the attribute comprises an age, a zip code, a name or an index.

15. The storage medium of claim 11, wherein:
   each plaintext value of the plurality of plaintext values is associated with an index value;
   the index values are within an index range; and
   the instructions, when executed by the machine, further cause the machine to, for the first plaintext value:
      divide the index range by the index value associated with the first plaintext value to determine a remainder; and
      wherein the encrypting is controlled based on the remainder to determine the first pseudonym value.

16. An apparatus comprising:
   at least one processor; and
   a memory to store instructions to, when executed by the at least one processor, cause the at least one processor to:
      access data representing a plurality of plaintext values having a plurality of ranges, wherein the plurality of plaintext values are associated with an attribute category, the plurality of plaintext values correspond to a collection of numbers for the attribute category, the plurality of ranges correspond to different ranges of numbers of the collection of numbers, and the collection of numbers has a statistical property; and
      determining a plurality of tokens corresponding to the plurality of plaintext values and preserving the statistical property, wherein a first token of the plurality of tokens for a first plaintext value of the plurality of plaintext values is associated with a first range of the plurality of ranges, wherein determining the first token comprises encrypting the first plaintext value to provide the first token, wherein the encrypting is controlled to cause the first token to be within the first range of the plurality of ranges and the encrypting is tweaked based on an attribute associated with the first plaintext value.

17. The apparatus of claim 16, wherein the instructions, when executed by the at least one processor, further cause the at least one processor to select an encryption permutation of a plurality of encryption permutations of a block cipher based on the attribute.

18. The apparatus of claim 16, wherein the instructions, when executed by the at least one processor, further cause the at least one processor to perform format preserving encryption to generate the plurality of tokens.

19. The apparatus of claim 16, wherein, for each range of the plurality of ranges, a total number of plaintext values of the plurality of plaintext values within the range is the same as a total number of tokens of the plurality of tokens within the range.

20. The apparatus of claim 16, wherein for at least one range of the plurality of ranges, plaintext values of the plurality of plaintext values within the range have less entropy than the tokens of the plurality of tokens within the range.

* * * * *